United States Patent [19]

Hayes

[11] Patent Number: 4,768,391
[45] Date of Patent: Sep. 6, 1988

[54] ACTUATOR LOAD SIMULATOR

[75] Inventor: Leo Z. Hayes, Fullerton, Calif.

[73] Assignee: Rockwell International Corporation, El Segundo, Calif.

[21] Appl. No.: 9,449

[22] Filed: Feb. 2, 1987

[51] Int. Cl.$^4$ .......................................... G01M 19/00
[52] U.S. Cl. .................................. 73/865.9; 73/866.4
[58] Field of Search ..................... 73/168, 862, 862.38, 73/862.51, 862.52, 865.9, 866.4, 862.08, 862.09

[56] References Cited

U.S. PATENT DOCUMENTS 2,490,773  12/1949  Black ........................... 73/862.52 X
4,435,979   3/1984  Gilgore ......................... 73/866.4 X Primary Examiner—Charles A. Ruehl
Attorney, Agent, or Firm—H. Fredrick Hamann; George A. Montanye; Jonathan B. Orlick

[57] ABSTRACT

An apparatus and method for the testing and evaluation of numerous actuators having different load characteristics. The apparatus comprises a fixed frame, having a first and second lever arms pivotally attached to the fixed frame. An expandable, contractible spring element is pivotally connected between the first and the second lever arms functioning to transmit forces between the first and the second lever arms. A force is applied to the second lever arm and an actuator under test which is pivotally attached to the first lever arm constrains displacement of the first lever arm. A computer measures and records the displacements of the first and the second lever arms from a known starting position.

9 Claims, 2 Drawing Sheets

ACTUATOR LOAD SIMULATOR

This invention was made with Government support under Contract No. F04704-84-C-0061 awarded by the Air Force. The Government has certain rights in this invention.

BACKGROUND OF THE INVENTION

1. Field of the Invention

The instant invention relates to an apparatus and method for testing numerous actuators, and more particularly to the testing and evaluation of actuators having different load characteristics.

2. Description of the Prior Art

Actuators, are devices which are typically utilized for the positioning of a load or loads under control. These devices are used in a multitude of applications, for example, on ships for navigational and stabilization control, on construction equipment, on aircraft, and on rocket engine nozzles. One specific example of the use of load actuators is for the proper positioning of a rocket engine nozzles to deflect exhaust gases from the rocket engines to control the flight trajectory of propulsion vehicles. During a vehicle's flight a myriad of forces act to oppose the deflection of the engine nozzle. These forces are a function of many parameters including, but not limited to the position of the nozzle deflection with respect to the flow of engine nozzle exhaust gases, the rate of change of the nozzle deflection and the effects of mass inertia on the acceleration of the nozzle deflection. The controlled positioning of the engine nozzle via a load actuator in response to the forces acting upon it is clearly indispensable to maintenance of the desired trajectory of a propulsion vehicle. Similarly, by way of another example, actuators utilized in nautical environments must be capable of contending with the effects of the forces of water along the control surfaces of a ship's rudder, or other like devices. These hydraulic forces are typically counteracted by the actuator to obtain the desired navigational results.

It is desirable to test actuator designs prior to their use to ensure that the actuator will meet operational requirements. An untested actuator may jeopardize the reliability of an expensive propulsion system and its associated payloads, or may even result in the destruction of aircraft. Heretofore, load actuator simulators were constructed utilizing passive load elements. These test devices, normally bulky and expensive to manufacture, would produce a force proportional to a known actuator position, using a very stiff spring element. A force proportional to the actuator acceleration would also be generated using a predefined weight or mass. The spring element, heretofore, typically employed was a stiff metal column of considerable diameter and length that acted like a spring against which an actuator was attached for purposes of testing. These prior art testing devices were designed for a fixed set of known operational conditions, and thereby were not easily changeable if and when a system's design changed. Furthermore, these passive prior art devices failed to simulate critical real time forces such as nozzle friction loads which, at varying times, become major load factors in particular actuator applications.

From the foregoing, the need should be appreciated for a new and improved actuator load simulator having a means for testing a variety of different actuators without the need for an expensive custom designed test apparatus whose usefulness is limited to a particular design or set of fixed operational conditions. Accordingly, a fuller understanding of the invention may be obtained by referring to the SUMMARY OF THE INVENTION, and the detailed Description of the Preferred Embodiment, in addition to the scope of the invention defined by the claims taken in conjunction with the accompanying drawings.

SUMMARY OF THE INVENTION

The invention is defined by the appended claims with a specific embodiment shown in the attached drawings. For the purposes of summarizing the invention, the invention comprises a fixture which is particularly suitable for use in testing actuators under a variety of dynamically changing load conditions. More specifically, a preferred embodiment comprises two lever arms which are pivotally connected together at a single pivot point. The actuator which is to be tested is mounted in a manner such that one end of the actuator under test (AUT) is attached to one of the lever arms of the test fixture and the other end of the AUT is attached to a stationary portion of the fixture. A force actuator is in turn pivotally attached to the remaining lever arm and functions to control the differential deflection of the two movable lever arms with respect to a spring constant force that is a known factor. A hydraulic cylinder or a conventional mechanical spring connects the two moveable lever arms to provide the spring constant force on the AUT. The force actuator position is controlled using conventional position control electronics and hydraulics. A computer is utilized to compute the dynamic loads that would be experienced by the AUT in response to the AUT's motions as a result of the varying forces subjected on it during the test in the subject apparatus.

It is an object of this invention to provide an apparatus and method which overcomes the aforementioned inadequacies of the prior art devices and to provide improvements which are of a significant contribution to the advancement of actuator testing art.

Another object of this invention is to provide an apparatus and method that yields reliable, repeatable test results on a variety of actuators.

It is yet another obJect of this invention to provide an actuator load simulator having a means for testing a variety of different actuators without the need for an expensive, custom manufactured test apparatus whose usefulness is limited only to a particular design or to a set of fixed operational conditions.

The foregoing has summarized the invention and has outlined some of the more pertinent objects of the invention. The objects should be construed to be merely illustrative of some of the more prominent features and applications of the intended invention. Many other beneficial results can be obtained by applying the disclosed invention in a different manner or modifying the invention within the scope of the disclosure. The summary has outlined rather broadly the more pertinent and important features of the present invention in order that the Detailed Description of the Invention that follows may be better understood so that the present contribution to the art can be more fully appreciated.

Additional features of the invention will be described hereinafter which form the subject of the claims of the invention. It should be appreciated by those skilled in the art that the conception of the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Further objects and advantages of the present invention will become apparent as the following description of the preferred embodiment proceeds, taken in conjunction with the accompanying drawing in which.

Drawing reference numbers:
10 Actuator Load Simulator
12 Horizontal Lever Arm
14 Vertical Lever Arm
15 Base end of 16
16 Actuator under test (AUT)
17 Pivot point of attachment of 19 to 12
18 Force Actuator
19 Operational end of 16
20 Spring Force Actuator
21 Spring Force Lever Arm
22 Simulator Frame
23 Operational end of 18
24 Common Pivot Point of 12 and 14
25 Base end of 18
26 Pivot point of attachment of 18 to 26
30 Pivot point of attachment of 12 to 21
31 Pivot point of attachment of 20 to 14
32 Standard computer system
34 Lines illustrating functional closed loop control by 32
35 Position control electronics

DESCRIPTION OF THE PREFERRED EMBODIMENT

Figure 1:
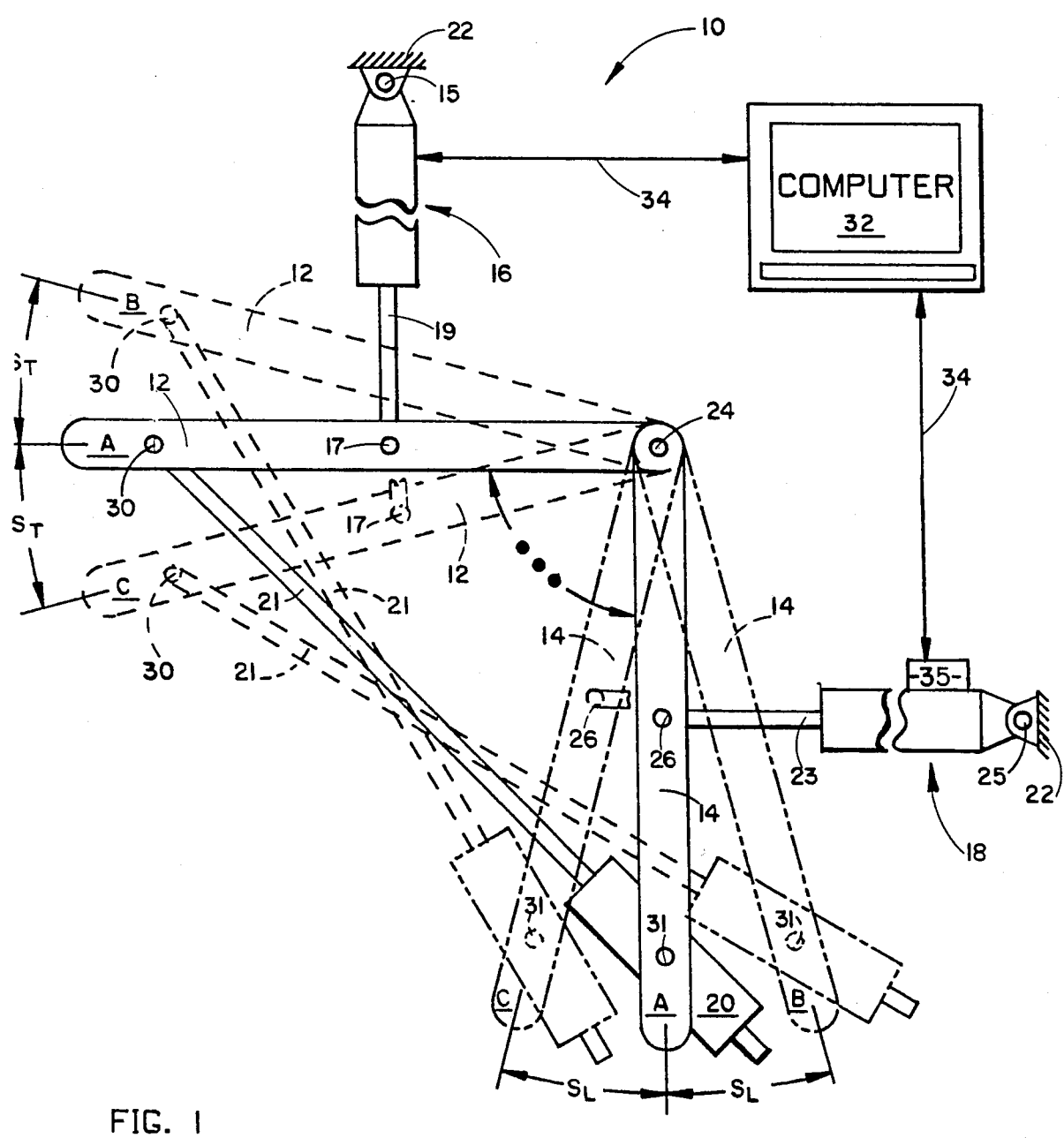
FIG. 1 is a schematic elevational view of the apparatus constructed in accordance with the present invention.

FIG. 1 illustrates a schematic representation of the actuator load simulator 10. More specifically, FIG. 1 illustrates two lever arms 12 and 14 each respectively being pivotally attached at a common pivot point 24. An actuator under test (AUT) 16 is also shown pivotally connected at its base end 15 to the fixed simulator frame 22. The operational end 19, of the AUT 16 is shown pivotally attached at a point 17 approximately midway between the pivot points 24 and 30 of the horizontal lever arm 12. In a similar fashion a force actuator 18 is shown in FIG. 1 pivotally attached at its operational end 23 a point 26 approximately midway between the pivot points 24 and 31 of the vertical lever arm 14. The base end 25 of the force actuator 18 is in turn pivotally attached to the fixed simulator frame 22.

Further inspection of FIG. 1 shows a spring force actuator 20 pivotally attached to the vertical lever arm 14 at point 31. The spring force actuator 20 includes a spring force lever arm 21 that is pivotally attached to the end of the horizontal lever arm 12 at point 30. The function of the spring force actuator 20 is to transmit forces that are proportional to the differential deflection of the horizontal and vertical lever arms 12 and 14 respectively. While a spring force actuator 20 has been shown for this purpose, a conventional mechanical spring or similar device which is capable of expanding and contracting in response to forces applied thereto may also be utilized with the subject invention.

Figure 2:
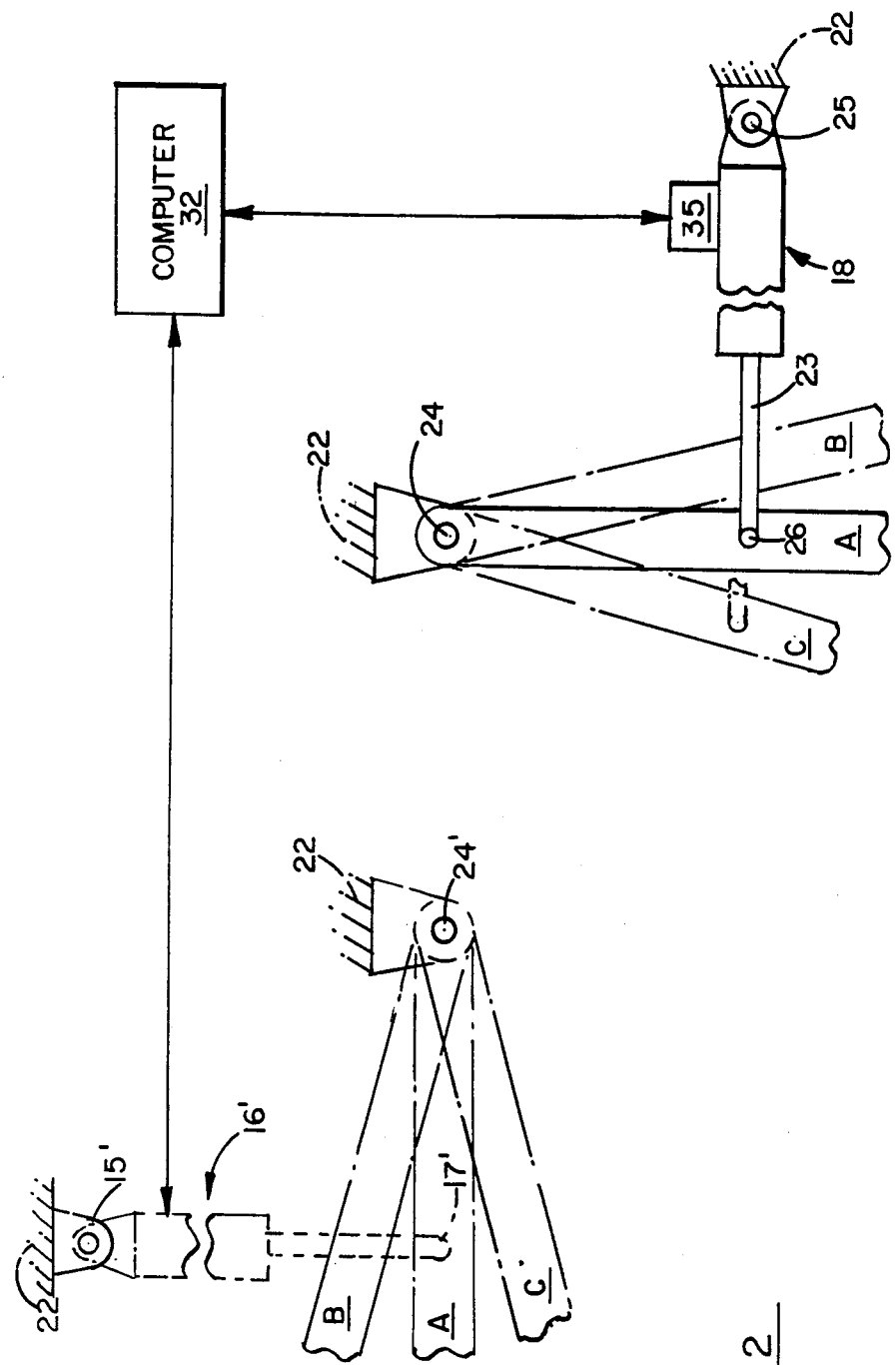
FIG. 2 is a partial schematic elevational view illustrating another embodiment of the present invention with separately pivotal lever arms.

Without departing from the spirit and scope of this invention, it is to be noted that the preferred embodiment of the apparatus as illustrated in the drawing and as described herein, is only one particular embodiment of the apparatus 10 which may be utilized in conjunction with the teachings outlined herein. Accordingly, the intended pivotal points of connection of the various lever arms as shown and described to the AUT 16 and to the force actuator 18, as well as to the spring force actuator 20 are the preferred points of connection. Many other positions of connection however, may be utilized within the scope of the invention contemplated herein. For example, the AUT 16 may be positioned along any point of the horizontal lever arm 12 that would correspond to the physical restrictions of the actuator device installation of a particular application. Similarly, the force actuator 18, the spring force actuator 20, and spring force lever arm 21 may be pivotally attached at any point along the respective lever arms 12 and 14. It is also to be noted that the force actuator 18 is typically mounted at right angles to the normal position of the vertical lever arm 14 in order to reduce the force calculations that are involved. Furthermore, the spring actuator's 20 position of pivotal connection along the horizontal and vertical lever arms 12 and 14 is not critical due to the fact that this geometry is known and that it is necessary to determine only how the forces are transmitted between the lever arms 12 and 14 respectively. Finally, as shown in FIG. 2, another embodiment of the actuator load simulator 10, contemplates the use of two lever arms each separately, pivotally connected to frame 22 at points 24 and 24$^1$ respectively. In this later embodiment the two lever arms are also connected by a common spring force (as shown in FIG. 1), as previously described for the preferred embodiment.

The actuator load simulator 10 contemplated herein is utilized in combination with a conventional computer system 32. More particularly, the computer system 32 functions to control conventional position control electronics 35, well known in the art in order to move the various lever arms 12, 14, and 21 respectively. The movement of these arms is coordinated in order to simulate the forces that an actuator may encounter during actual operational use. The lines 34 in FIG. 1 diagrammatically illustrate this functional closed loop control by the computer system 32.

The computer system 32 additionally functions to coordinate the measurements and recordation of the various position displacements of the lever arms 12 and 14 in response to varying test parameters. More particularly, the computer system 32 records and generates forces via the force actuator 18 to induce displacements/positions of the arms 12 and 14 utilizing well known mathematical algorithms. These displacements are depicted in FIG. 1 by the reference characters $S_L$ and $S_T$. The displacements $S_L$ and $S_T$ as shown in the figure are measured from a known starting position. In the preferred embodiment the known starting position is preferably with the two lever arms 12 and 14, each being positioned perpendicularly with respect to each other. This starting position is preferred to eliminate additional mathematical calculations, and is indicated in FIG. 1 by the reference characters A located on each respective lever arm 12 and 14. It is to be noted that any desired starting position for the lever arms 12 and 14 respectively may be selected without departing from the spirit and scope of the instant invention.

As varying forces are applied to the AUT 16, opposing forces as controlled by the computer system 32 will be generated at the force actuator 18. The results of these changing forces creates the displacements $S_L$ and $S_T$ as outlined above. The reference characters indicated in FIG. 1 by the letters B and C, illustrate but a few of the infinite positions that the lever arms 12 and 14 may assume in response to the varied forces applied during testing.

The apparatus 10 contemplated by this invention may be better understood by way of an example of the simulation of a thrust vector actuator. A thrust vector actuator, in this context refers to an actuator that is used to control the desired positioning of a rocket engine nozzle during the flight of a propulsion vehicle. Accordingly, the actuator load simulator 10 and its associated computer system 32 will hereinafter be described with respect to the testing of a thrust vector actuator. The nozzle actuator load simulator 10 will vary flight parameters as testing begins in order to simulate forces that will be encountered during the actual use of an engine nozzle.

These varying test parameters correspond to a force, $F_L$, generated by the propulsion vehicle's engine nozzle as a complex function of the proportion vehicle's nozzle position, $S_N$, the nozzle velocity, $S'_N$, and the nozzle acceleration, $S''_N$. More simplistically, this propulsion nozzle force can be expressed as a function of the following formula:

$$F_L = K_N \times S_N + K_V \times S'_N + K_A \times S''_N$$

where $K_N$, $K_V$ are proportionality coefficients for the nozzle position, velocity and acceleration. More specifically:

$K_N$ = Wind drag constant + mechanical displacement forces
$K_V$ = Nozzle friction constant
$K_A$ = Mass inertia constant The force generated by the nozzle actuator load simulator 10 or $F_L$ in the formula can be obtained by the following equation:

$$F_L = \frac{S_T + S_L}{K_{LS}}$$

where:
$S_T$ = Horizontal lever arm 12 displacement
$S_L$ = Vertical lever arm 14 displacement
$K_{LS}$ = Actuator Load simulator 10 spring constant as maintained by the spring force actuator 20
$F_L$ = Force to be generated by the load nozzle simulator 10.

The above equation can be rewritten to obtain the test actuator position required to control the load simulator force $F_L$ to a point which the test actuator would actually experience in flight. The rewritten equation appears as follows:

$$S_L = K_{LS} \times F_L - S_T$$

By controlling the load actuator position, $S_L$, as the test actuator moves, the force, $F_L$, can be controlled via the standard computer system 32 thereby simulating the forces that would be applied to the thrust vector actuator 16 in actual flight. The thrust vector actuators 16 response to these forces is recorded, plotted and then later analyzed to determine whether or not the particular actuator under test 16 will function correctly during its actual operational use.

The application of the actuator load simulator 10 as described above to a thrust vector actuator can easily be extended to many other and varied applications simply by altering the mathematical algorithms under which the computer system 32 operates. This facet of the actuator load simulator 10 facilitates the simplistic adoption and use of the actuator load simulator 10 in testing a myriad of actuators which must correctly function under an accompanying myriad of operational conditions.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination arrangements with parts may be resorted to without departing from the spirit and scope of the invention.

Now that the invention has been described, what is claimed is:

1. An actuator load simulator comprising in combination:
   a fixed frame;
   first and second lever arms pivotally attached to said fixed frame;
   a means for controllably applying force to said second lever arm;
   an expandable, contractible means pivotally connected to said first and said second lever arms whereby said force is transmitted between said first and said second lever arms; and
   a means for measuring and recording displacements of said first and said second lever arms from a known starting position as a result of said application of force.

2. The apparatus of claim 1, wherein said first and said second lever arms are pivotally attached to said fixed frame at a single pivot point.

3. The apparatus of claim 1, wherein said first and said second lever arms are pivotally attached to said fixed frame at separate pivot points.

4. The apparatus of claim 1, wherein said means for controllably applying force comprises:
   a computer; and
   a force actuator pivotally attached to said second lever arm, said force actuator being in communication with said computer.

5. The apparatus of claim 4, wherein said computer controls said force actuator via position control means utilizing mathematical algorithms in response to said measured displacements.

6. The apparatus of claim 5, additionally comprising means for pivotally attaching an actuator for testing to said fixed frame and to said first lever arm, wherein said actuator for testing constrains displacement of said first lever arm.

7. An actuator load simulator comprising in combination:
   a fixed frame;
   first and second lever arms movably attached to said fixed frame;

a means for controllably applying force to said second lever arm;

an expandable, contractible means pivotally connected to said first and said second lever arms whereby said force is transmitted between said first and said second lever arms; and a means for measuring and recording displacements of said first and said second lever arms from a known starting position as a result of said application of force.

8. A method for non-passively testing an actuator in conjunction with first and second lever arms movably connected together by an expandable, contractable member, comprising the steps of:

controllably applying a force to said second lever arm functioning to cause a displacement of said second lever arm;

differentially transmitting said force to said first lever arm via said expandable, contractable member causing a displacement of said first lever arm;

measuring said displacements; and varying said force applied to said second lever arm in response to said measured displacements.

9. The method of claim 8, further comprising the step of recording said displacements for analysis.

* * * * *